Figure 3:
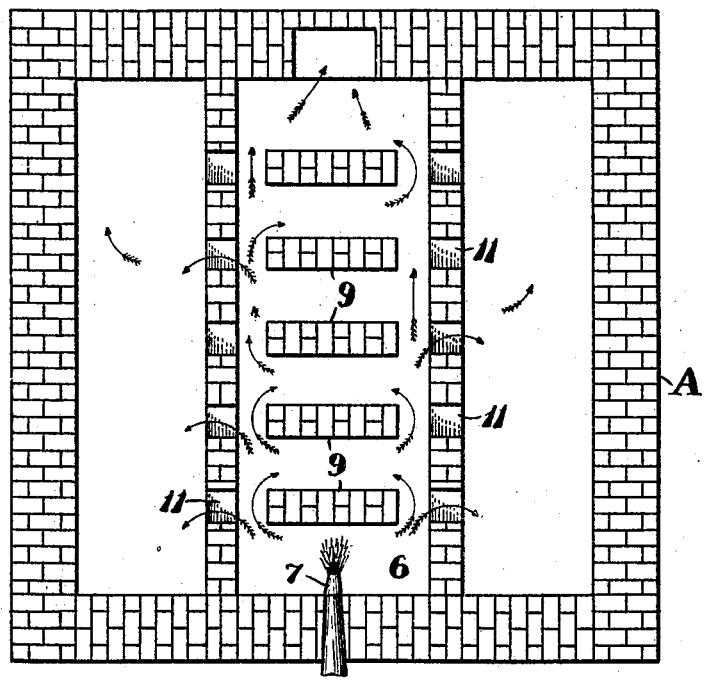

No. 819,575. PATENTED MAY 1, 1906.
G. A. MULLER.
BAKING APPARATUS.
APPLICATION FILED SEPT. 29, 1905.
2 SHEETS—SHEET 1.
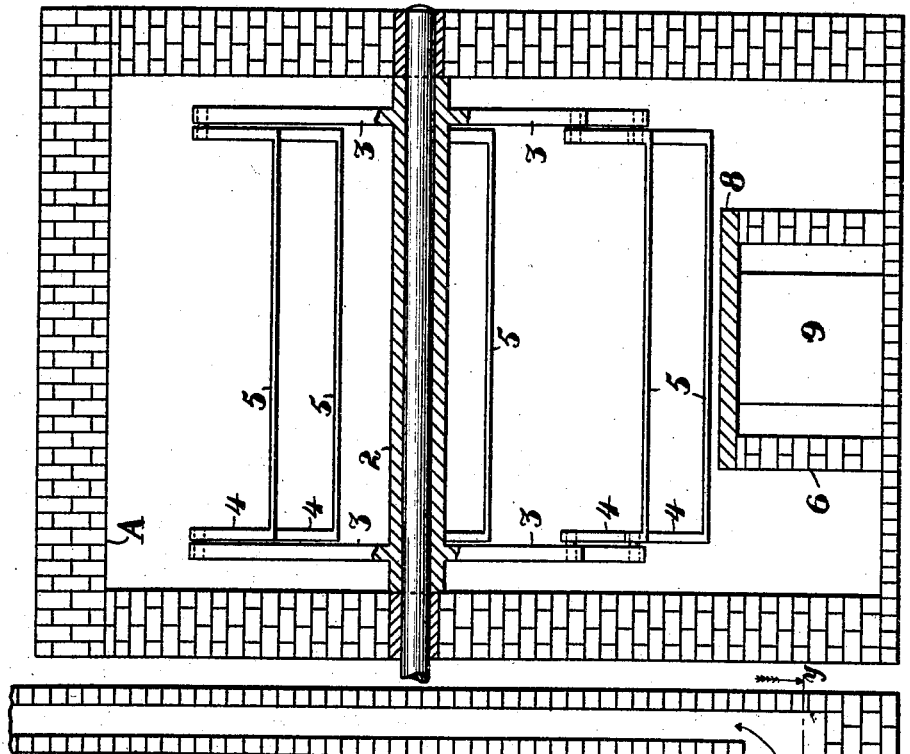
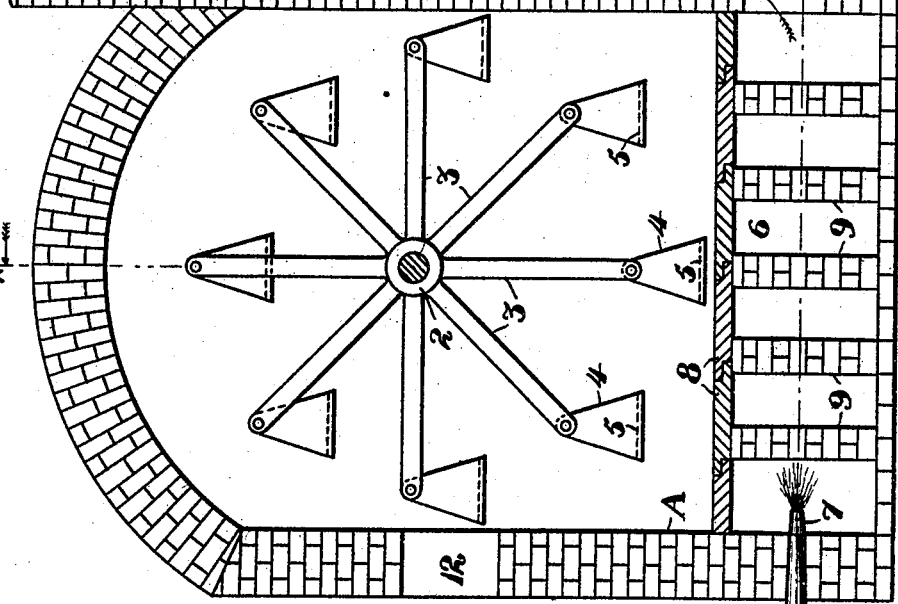
Witnesses:-
Inventor,
George A. Muller
By Geo. H. Strong. atty No. 819,575. PATENTED MAY 1, 1906.
G. A. MULLER.
BAKING APPARATUS.
APPLICATION FILED SEPT. 29, 1905.

2 SHEETS—SHEET 2.

UNITED STATES PATENT OFFICE.

GEORGE A. MULLER, OF SAN FRANCISCO, CALIFORNIA.

BAKING APPARATUS.

No. 819,575.   Specification of Letters Patent.   Patented May 1, 1906.

Application filed September 29, 1905. Serial No. 280,682.

*To all whom it may concern:*

Be it known that I, GEORGE A. MULLER, a citizen of the United States, residing in the city and county of San Francisco and State of California, have invented new and useful Improvements in Baking Apparatus, of which the following is a specification.

My invention relates to an apparatus which is designed for baking crackers, cakes, bread, and the like.

It consists of a revoluble carrier and containing-chamber and a fireplace or furnace located below said chamber and adapted for an oil-fuel and means by which the heat is distributed and delivered into the baking-chamber.

It also comprises details of construction which will be more fully explained by reference to the accompanying drawings, in which—

Figure 1 is a side sectional elevation of the apparatus. Fig. 2 is a section on line X of Fig. 1. Fig. 3 is a section on line Y of Fig. 1.

In the construction of my apparatus I build an oven or chamber A of any suitable or desired shape and dimension. Within this chamber is journaled a shaft having upon it a drum or hub 2 with radial arms 3, and to the outer ends of these arms are pivoted links or supports 4 for trays or platforms 5, which are thus suspended from the ends of the arms and will maintain a horizontal position during the revolution of the shaft. Any suitable or desired power may be applied to rotate the shaft and revolve the trays within the chamber at such speed as may be found suitable. In order to supply the requisite heat to this chamber, I have shown a furnace which may be made of brick or other suitable material, as at 6. This furnace is here shown as extending through the center of the lower part of the chamber and may be provided with an oil-burner, as at 7. The top of the furnace may be made of tiles, as at 8, and these tiles are supported upon transverse piers 9, which are here shown as being of less length than the width of the furnace-chamber, thus allowing passages upon each side, through which the heat products may pass to the discharge-flue located at the end of the furnace opposite to the burner.

The heat generated will thus pass around the ends of the piers, and currents thus established will distribute the heat through the furnace-chamber. Openings are made at intervals in the sides of the chamber, as shown at 11, for the escape of the heat-products into the baking chamber or oven above.

The front wall of the baking-chamber has an opening made in it, as at 12, and this opening is substantially in a horizontal plane opposite the axis of the revoluble carrier, so that as each tray or table 5 arrives at the point opposite the oven's mouth the tray may be loaded or its contents inspected or removed after the baking is finished. Thus a large quantity of crackers, cakes, bread, or other articles to be cooked may be placed upon these trays and removed therefrom as they are finished, and the oven may contain cooking material in all stages of completion.

Having thus described my invention, what I claim, and desire to secure by Letters Patent, is—

1. A baker's oven having an oven-chamber and a revoluble carrier therein having means for supporting the articles to be baked, a furnace extending through the center of the lower part of the oven, closed at the top and having a series of transversely-extending piers for diverting the heat-currents said piers forming supports for the closed top of the furnace and having their ends terminating short of the side walls of said furnace, said side walls having openings proximate to the ends of the piers and through which openings heat products will pass into the oven-chamber, a hydrocarbon-burner located at one end of the furnace and discharging in line with the piers, whereby the course of the heat products is diverted, and a discharge-flue at the opposite end of the furnace.

2. A baker's oven having an oven-chamber, a furnace extending through the center of the lower part thereof said furnace having a fuel-inlet at one end and a discharge-flue at the opposite end, a series of parallel transverse piers in the furnace between the inlet and discharge ends thereof said piers having their ends terminating short of the side walls of the furnace and said side walls having openings proximate to the ends of the piers and into which openings the heat products are diverted, a tiled structure forming a closed top for the furnace said piers supporting said top, and a revoluble carrier in the oven-chamber directly above the closed top of the furnace and having means for supporting the articles to be baked.

In testimony whereof I have hereunto set my hand in presence of two subscribing witnesses.

GEORGE A. MULLER.

Witnesses:
S. H. NOURSE,
HENRY P. TRICOU.